United States Patent
Sonobe et al.

(10) Patent No.: US 6,739,213 B2
(45) Date of Patent: May 25, 2004

(54) STEERING WHEEL

(75) Inventors: Akihiko Sonobe, Nishikasugai-gun (JP); Ichizo Shiga, Nishikasugai-gun (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 0 days.

(21) Appl. No.: 09/971,670

(22) Filed: Oct. 9, 2001

(65) Prior Publication Data
US 2002/0040616 A1 Apr. 11, 2002

(30) Foreign Application Priority Data
Oct. 10, 2000 (JP) .................................. P. 2000-308860

(51) Int. Cl.[7] .................................................. B62D 1/04
(52) U.S. Cl. ........................................ 74/552; 280/777
(58) Field of Search ............................. 74/552; 280/777

(56) References Cited

U.S. PATENT DOCUMENTS

| | | | | |
|---|---|---|---|---|
| 5,356,173 A | * | 10/1994 | Hongou et al. | 280/728.2 |
| 5,383,682 A | * | 1/1995 | Nagata et al. | 280/731 |
| 5,855,145 A | * | 1/1999 | Hosoi et al. | 403/259 |
| 6,073,514 A | * | 6/2000 | Isomura | 280/777 |
| 6,109,646 A | | 8/2000 | Nagata et al. | 280/701 |
| 6,299,201 B1 | * | 10/2001 | Fujita | 200/61.55 |
| 6,422,594 B2 | * | 7/2002 | Hasebe | 200/61.55 |

FOREIGN PATENT DOCUMENTS

| | | |
|---|---|---|
| EP | 0 488 618 A1 | 6/1992 |
| JP | A-11-198818 | 7/1999 |

* cited by examiner

*Primary Examiner*—David A. Bucci
*Assistant Examiner*—Julie K. Smith
(74) *Attorney, Agent, or Firm*—Posz & Bethards, PLC

(57) ABSTRACT

First and second spoke cores are arranged linearly through the boss plate so that most of the lower ends of the first and second spoke cores are located above a middle line. A third spoke core is arranged in a direction perpendicular to the first and second spoke cores. A pair of tine portions are provided in the third spoke core so as to be connected to the first and second spoke cores, thereby the tine portions and the first and second spoke cores intersect each other obliquely. In the tine portions, through holes and reception seats are provided so that the air bag module is fixed with screws and the through holes while the air bag module abuts on the reception seats.

6 Claims, 3 Drawing Sheets

STEERING WHEEL

BACKGROUND OF THE INVENTION

1. Field of the Invention

The present invention relates to a steering wheel and particularly to a steering wheel provided with an air bag apparatus.

The present application is based on Japanese Patent Application No. 2000-308860, which is incorporated herein by reference.

2. Description of Related Art

Conventionally, a steering wheel of this type is formed by a core member, as a base material, covered with resin or the like. As the core member, for example, one shown in FIG. 5 is used.

This core member 100 is constituted by a boss plate 101 connected to a steering shaft not shown, an annular rim 102 with the boss plate 101 as a center, and a plurality of spokes 103 connecting the boss plate 101 and the rim 102.

In the case where the spokes 103 are provided by three, for example, these spokes may be provided in the following mode.

That is, of these three spokes 103, a first spoke 103a and a second spoke 103b are disposed to be arranged substantially linearly through the boss plate 101 when those spokes are viewed from the front of the steering wheel. On the other hand, the third spoke 103c is provided in such a position that, with the boss plate 101 as a center of rotation, the first and second spokes 103a and 103b are respectively rotated by about 90 degrees counterclockwise and clockwise respectively. The end portion of the third spoke 103c at the boss plate 101 side is made to branch off into two tines the ends of which are connected to the first and second spokes 103a and 103b respectively.

Further, an air bag module 104 provided with a not-shown inflator, an air bag, or the like, is disposed above the boss plate 101 of the core member 100 configured thus. Here, with the steering shaft in a neutral state, where rotating operation is not carried out, a middle line m, which intersects a center axis line of the steering shaft so as to divide the steering wheel into upper and lower portions, is defined as follows. The air bag module 104 in the steering wheel is fixed by means of screws and through holes 105. The through holes 105 are formed in the first and second spokes 103a and 103b and are substantially on the above-mentioned mentioned middle line m. When an impact exceeding a predetermined range acts on the vehicle, the air bag accommodated in the air bag module 104 is deployed to receive a passenger. In the conventional steering wheel, however, as shown in FIGS. 6A and 6B, a large load in the vehicle forward direction as indicated by an arrow in the drawing may act on the lower end portion of the rim 102 of the core member 100 due to a change in posture of the passenger. If such a large load acts on the rim 102 of the steering wheel, the rim 102 may be deformed.

However, the air bag module 104 is attached to the first and second spokes 103a and 103b and on the middle line m of the steering wheel as described above. Here, for example, a case where a large load acts on the lower side of the steering wheel, while in the neutral state, in which the steering wheel is not rotated, is considered. In such a case, because the first and second spokes 103a and 103b of the core member 100 are very rigid, the steering wheel is deformed and bent with respect to the axial line of the first and second spokes 103a and 103b. Hence, it might occur that the air bag module 104 is not displaced in accordance with the deformation of the rim 102, and the lower end of air bag module 104 may separate from the steering wheel. This situation changes the direction of the air bag deployment with respect to the advancing direction of the passenger, and there is a fear that the impact absorption effect will be lowered.

SUMMARY OF THE INVENTION

The present invention has been achieved by paying the attention to such a problem in the background art. It is an object of the present invention to provide a steering wheel in which the development direction of the air bag is changed in accordance with deformation of the steering wheel.

In order to achieve the above object, the invention has a gist in that a steering wheel is constituted by: a boss portion connectable to a steering shaft; a rim portion provided to surround the boss portion; a spoke portion connecting the boss portion and the rim portion to each other; and an air bag module; wherein the spoke portion include a first, a second and a third spoke cores, the first and second spoke cores being arranged substantially linearly through the boss portion so as to continue uninterruptedly with each other when the steering wheel is viewed from a front side thereof, the third spoke core being arranged so as to connect the first and second spoke cores to the rim portion in a direction substantially perpendicular to an extending direction of the first and second spoke cores; and wherein the air bag module is provided with a fixing position at a position apart from a center line extending in the longitudinal direction of the first and second spoke cores.

In the invention, even if the steering wheel is deformed due to large load acting on the steering wheel, the air bag module is easily displaced in accordance with the deformation of the steering wheel. Further, in accordance with the displacement of the air bag module, the direction of developing the air bag received in the air bag module is changed.

In the invention, lower ends of the first and second spoke cores may be located substantially above a middle line which passes on a center axis of the steering shaft so as to divide the steering wheel into the upper and lower portions, in the neutral state of the steering wheel.

By the above structure, the difference in rigidity between respective portions of the rim portion becomes small, so that the difference in displacement between rotation positions of the steering wheel can be reduced.

In the invention, a branch portion bifurcated to provide two tines may be formed at an end of the third spoke core in a manner so that forward ends of said two tines are connected respectively to said first and second spoke cores and so that, when said steering wheel is viewed from the front side thereof, said two tines and said first and second spoke cores intersect each other obliquely in plane view.

By the above structure, the difference in rigidity between respective portions of the rim portion can be reduced, and the quantity of material for the third spoke core can be reduced so that the weight of the steering wheel can be reduced.

In the invention, the air bag module may be fixed to the branch portion in the third spoke core.

The air bag module can be displaced surely in accordance with the deformation of the steering wheel.

In the invention, in an air bag module fixing portion in the spoke cores, a reception seat on which the air bag module abuts partly may be provided.

In the above structure, when the air bag module is attached to the spokes, the air bag module abuts on the reception seat so that the air bag module can be attached stably.

BRIEF DESCRIPTION OF THE DRAWINGS

FIG. 6A shows a non-deformed state, FIG. 6B shows a deformed state.

DETAILED DESCRIPTION OF THE PREFERRED EMBODIMENTS

Hereunder, an embodiment of the steering wheel according to the present invention will be described by referring to FIGS. 1 to 4.

Figure 1:
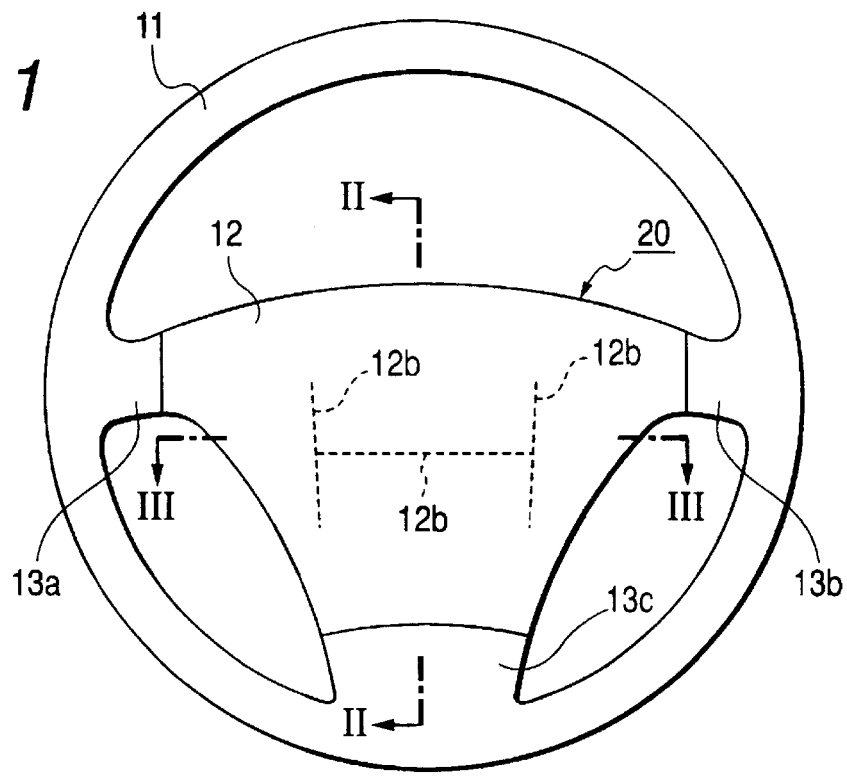
FIG. 1 is a plan view of a steering wheel according to an embodiment of the present invention.

As shown in FIG. 1, the steering wheel is constituted by an annular rim 11, a pad 12 disposed at the center of the rim 11, and three spokes 13a, 13b and 13c extending from the rim 11 to the pad 12. The rim 11 is connected to the forward end of a steering shaft 15 through spoke cores 33a to 33c in the spokes 13a to 13c which will be described later and through a not-shown gear mechanism. Thus, rotating operation of the steering wheel is transmitted to the steering shaft 15.

Further, this steering wheel is provided with an air bag module 20 at the portion of the pad 12.

Figure 2:
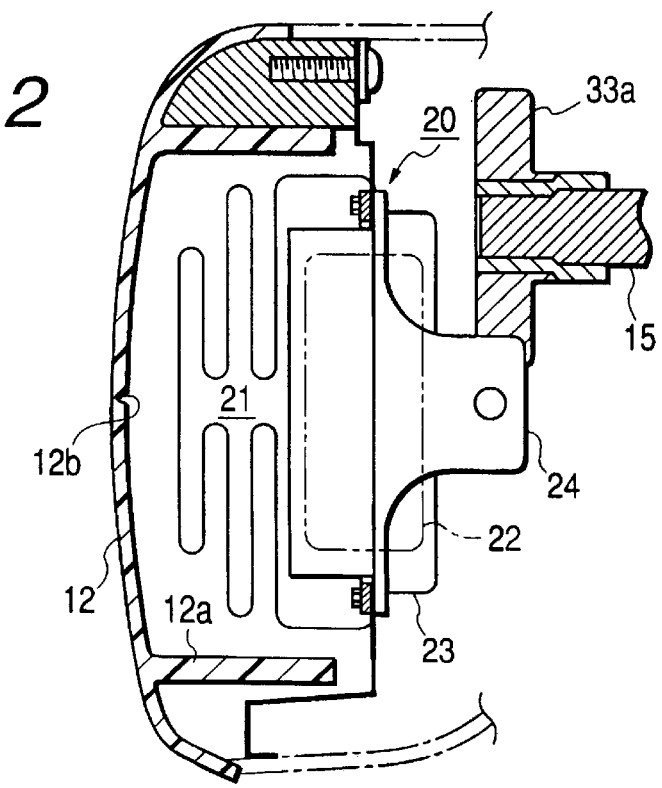
FIG. 2 is a sectional view taken on the line II—II in FIG. 1.

As shown in FIG. 2 which is a sectional structure of the steering wheel taken on the line II—II in FIG. 1, the air bag module 20 is disposed in a reception recess 12a on a back side of the pad 12. The air bag module 20 is constituted by an air bag 21 folded and received like a bag, an inflator 22 for supplying the air bag 21 with a gas for expansion, and a bag holder 23 for holding and fixing the air bag 21 and the inflator 22. The bag holder 23 is fixed to the pad 12 by screws. The air bag module 20 is provided as described above so that the pad 12 serves also as a cover to cover the air bag module 20. A tear line 12b, for example, H shaped, is formed by recess lines in the center of the back of the pad 12 so that the tear line 12b is pressed and broken when the air bag is expanded and deployed.

Figure 3:
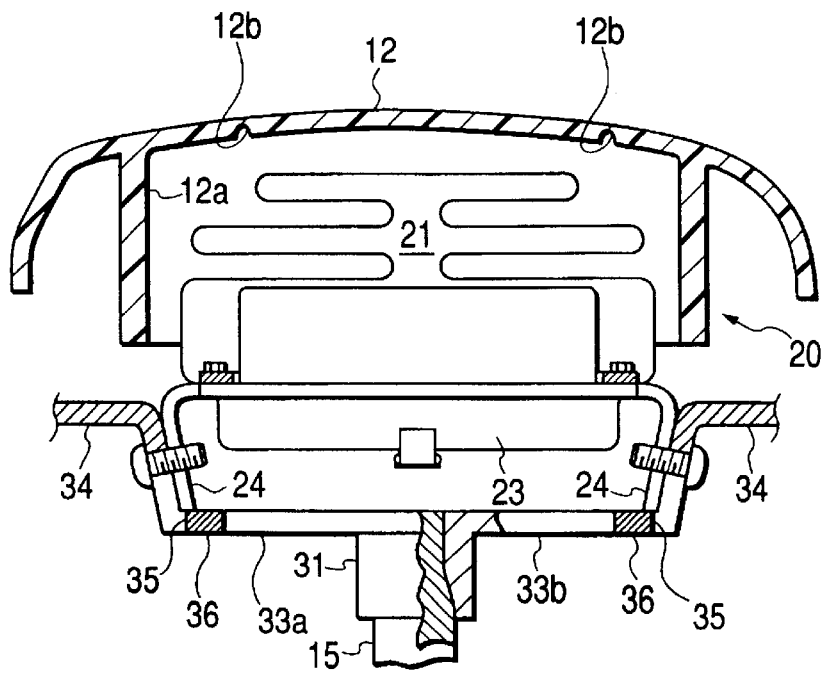
FIG. 3 is a sectional view taken on the line III—III in FIG. 1.

Further, as shown in FIG. 3 which is a sectional structure of the steering wheel taken on the line III—III in FIG. 1, in the bag holder 23 of the air bag module 20, the flanges of the bag holder 23 are partially expanded and bent downward to form fittings 24. The fittings 24 are fixed by screws to a core member 30 which will be described later.

Figure 4:
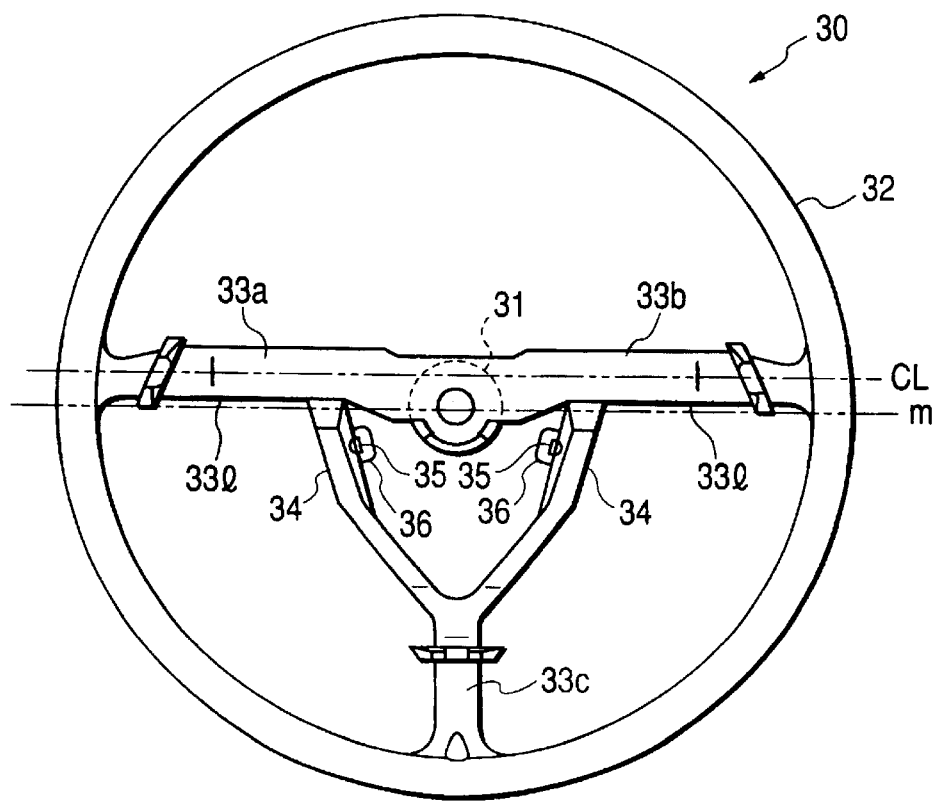
FIG. 4 is a plan view of a core member adopted in the steering wheel.
Figure 5:
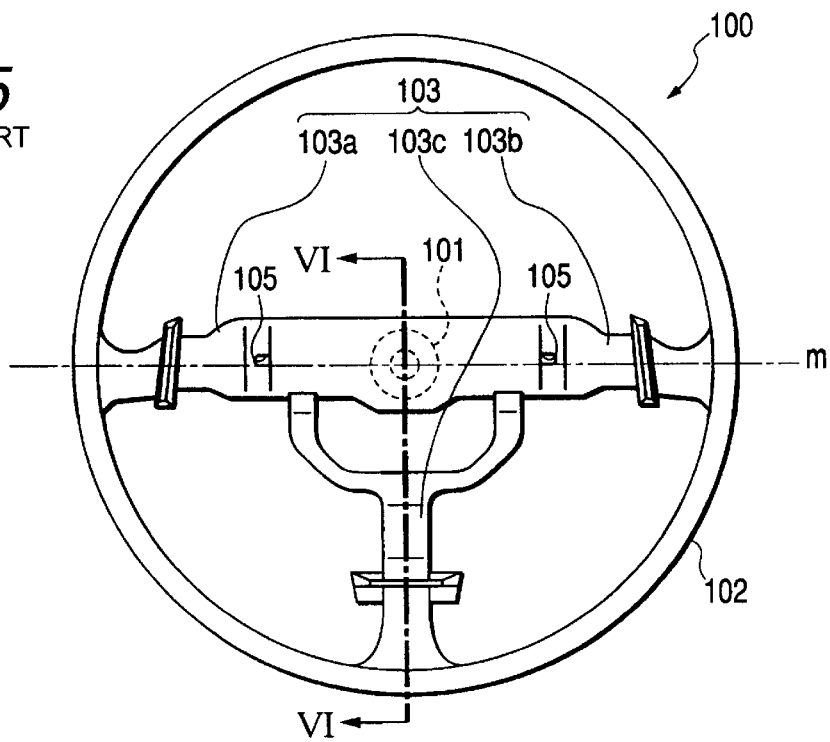
FIG. 5 is a plan view of a core member adopted in a related art steering wheel.
Figure 6A:
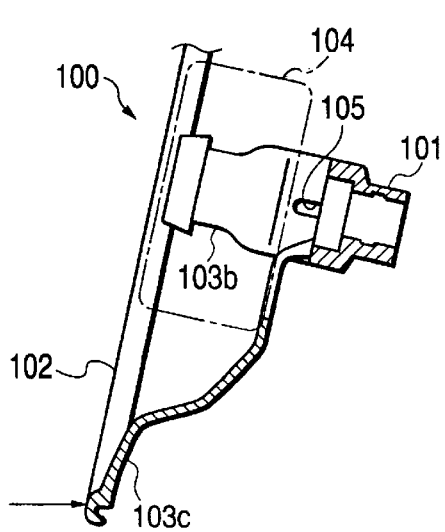
FIGS. 6A and 6B are sectional views taken on the line VI—VI in FIG. 5.
Figure 6B:
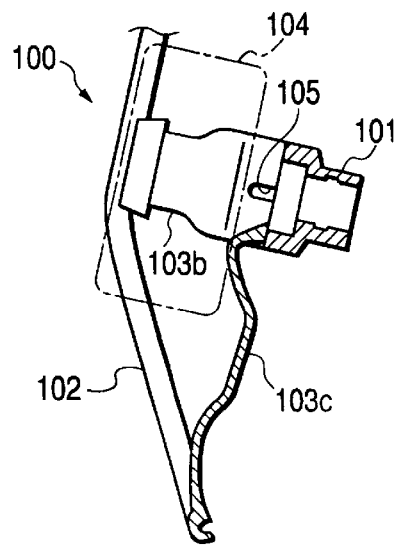

In the steering wheel configured thus, such a core member 30 as shown in FIG. 4 is used.

The core member 30 is provided with a boss plate 31 as a boss portion connected to the forward end of the steering shaft 15, an annular rim core 32 corresponding to the rim 11 of the steering wheel, and first to three spoke cores 33a to 33c corresponding to the three spokes 13a to 13c.

The rim core 32 is disposed with the boss plate 31 as a center, that is, to surround the boss plate 31.

Further, of the three spokes, the first and second spoke cores 33a and 33b are formed linearly through the boss plate 31 so as to continue uninterruptedly with each other when viewed from the front side of the steering wheel. The opposite ends of the thus formed first and second spoke cores 33a and 33b are connected to the rim core 32. On the other hand, an end of the third spoke core 33c is connected to the rim core 32 in the direction substantially perpendicular to the extending direction of the first and second spoke cores 33a and 33b. The end of the third spoke core 33c at the rim core 32 side has a substantially Y-shape and the other end of third spoke core 33c at the boss plate 31 side is made to branch off into two tine portions 34. The two tine portions 34 made to branch off thus are bent at their longitudinal centers and connected, at their forward ends, to the first and second spoke cores 33a and 33b respectively so that the tine portions 34 and the spoke cores 33a and 33b intersect each other obliquely when the steering wheel is viewed from the front side.

In this embodiment, as shown in FIGS. 3 and 4, a pair of through holes 35 as a fixing portion of the air bag module 20 are formed in the two tine portions 34 of the third spoke core 33c so as to be substantially opposite to each other. Further, reception seats 36 are provided under the through holes 35, so that the fittings 24 of the bag holder 23 abut on the seats 36 respectively. The air bag module 20 is fixed to the core member 30 by screws in the through holes 35. That is, the air bag module 20 is configured so that the air bag module 20 is fixed to the steering wheel in a position apart from the center line CL extending in longitudinal direction of the first and second spoke cores 33a and 33b. Specifically, in this embodiment, the fittings 24 of the air bag module 20 and the through holes 35 and the seats 36 formed on the third spoke core 33c are provided at a position under a center line CL of the first and second spoke cores 33a and 33b when the steering wheel is set in the neutral state where the steering wheel is not subjected to rotating operation position.

In the steering wheel according to this embodiment, for example, in the neutral state in which the steering wheel is not subjected to rotating operation, if a large load acts on a 1 lower side of the steering wheel so that the lower side portion of the rim core 32 is deformed toward the boss plate 31 side, the third spoke core 33c is also deformed in accordance with the deformation of the rim core 32. Hence, following the deformation of the third spoke core 33c, the air bag module 20 is also displaced. In accordance with the displacement of the air bag module 20, the direction of air bag deployment is also changed. As a result, the degree of difference between the direction of air bag deployment and the direction of passenger advancement toward the air bag 21 is lowered, and the impact absorption effect is improved.

Further, in this embodiment, the first and second spoke cores 33a and 33b are arranged such that, in the neutral state where the steering wheel is not subjected to rotating operation, most of the lower sides 331 of the first and second spoke cores 33a and 33b are located above a middle line m, which passes through the center of the steering wheel and divides the steering wheel in to two, upper and lower, portions. Further, the inner ends of the two tine portions 34 of the third spoke core 33c are connected obliquely to the first and second spoke cores 33a and 33b, as stated above. Hence, the difference in rigidity among positions in the rim 11 between the spokes 13a, 13b and 13c becomes small. Accordingly, the difference in quantity of displacement between rotation positions of the steering wheel can be made small.

According to the steering wheel of this embodiment, therefore, the following effects can be obtained.

(a) The air bag module 20 is fixed in a position apart from the center line CL of the first and second spoke cores 33a and 33b. As a result, generation of displacement between the direction of developing the air bag 21 and the direction of advancing the vehicle crew to the air bag 21 is lowered, and the impact absorption effect is improved.

(b) The first and second spoke cores 33a and 33b are arranged such that most of the lower sides 331 of the first and second spoke cores 33a and 33b are located above the middle line m. Hence, the difference in rigidity between portions of the rim 11 becomes small, and the difference in quantity of displacement between rotation positions of the steering wheel can be made small.

(c) The forward ends of the two tine portions 34 of the third spoke core 33c are connected obliquely to the first and second spoke cores 33a and 33b, as stated above. Hence, the difference in rigidity between portions of the rim 11 can be made smaller, and while the necessary rigidity is kept surely, the quantity of the material to be used can be reduced to thereby reduce the weight of the steering wheel.

(d) The attachment position of the air bag module 20 is provided at the two tine portions 34 of the third spoke core 33c. Accordingly, the air bag module 20 can be displaced surely in accordance with the displacement of the third spoke core 33c.

(e) The reception seats 36 are provided in the third spoke core 33c. Hence, when the air bag module 20 is attached to the third spoke core 33c, the fittings 24 of the bag holder 23 abut on the reception seats 36 so that the air bag module 20 becomes stable.

Modification

The embodiment of the present invention may be changed as follows.

In the embodiment described above, the two tine portions 34 of the third spoke core 33c are bent at their substantially longitudinal centers, and are connected to the first and second spoke cores 33a and 33b in this bent condition. On the other hand, in the modification, the tine portions 34 may be formed into straight or curved line shapes and connected to the first and second spoke cores 33a and 33b.

In the embodiment described above, the reception seats 36 are provided on the tine portions 34 of the third spoke core 33c. In the modification, no reception seats 36 may be provided.

In the embodiment described above, the air bag module 20 is fixed to the tine portions 34 of the third spoke core 33c. In the modification, for example, fittings are provided at a base portion of the third spoke core 33c and through holes are formed in the fittings so that the air bag module 20 is fixed by means of screws and the through holes.

In the embodiment described above, the tine portions 34 of the third spoke core 33c are connected to the first and second spoke cores 33a and 33b so that the first and second spoke cores 33a and 33b and the two tine portions 34 intersect each other obliquely when the steering wheel is viewed from the front side. In the modification, the tine portions 34 of the third spoke core 33c may be connected to the first and second spoke cores 33a and 33b so that the tine portions 34 and the first and second spoke cores 33a and 33b intersect perpendicularly to each other when the steering wheel is viewed from the front side.

In the embodiment described above, most of the lower sides 331 of the first and second spoke cores 33a and 33b are made to be located above the middle line m. In the modification, the first and second spoke cores 33a and 33b are arranged so that the center line CL of first and second spoke cores 33a and 33b approaches the middle line m.

As described above in detail, according to the present invention, generation of displacement between the direction of developing the air bag and the direction of advancing the vehicle crew to the air bag is lowered, and the impact absorption effect is improved.

Further, the difference in quantity of displacement between rotation positions of the steering wheel can be made small.

Further, while the necessary rigidity is kept surely, the weight of the steering wheel can be reduced.

Further, the air bag module can be displaced surely in accordance with the displacement of the third spoke core.

Further, the air bag module can be attached to the third spoke core stably.

What is claimed is:

1. A steering wheel comprising:

a boss portion connectable to a steering shaft;

a rim portion provided to surround said boss portion;

a spoke portion connecting said boss portion and said rim portion to each other, said spoke portion including a first spoke core, a second spoke core and a third spoke core, said first and second spoke cores being arranged substantially linearly through said boss portion so as to continue uninterruptedly with each other when said steering wheel is viewed from a front side thereof, said third spoke core being arranged so as to connect said first and second spoke cores to said rim portion in a direction substantially perpendicular to an extending direction of said first and second spike cores; and an air bag module mounted on said steering wheel;

wherein a fixing portion of said air bag module to said steering wheel is provided at a position apart from a center line extending in the longitudinal direction of said first and second spoke cores;

wherein the respective inner ends of the first and second spoke cores are located substantially above a middle line, which intersects a center axis of the steering shaft to divide the steering wheel in to the upper and lower portions, when the steering wheel is in a neutral state, in which the steering wheel is not rotated;

wherein a branch portion, which is bifurcated to provide two tines, is formed at an end of the third spoke core in a manner so that inner ends of the two tines are connected respectively to the first and second spoke cores and so that, when the steering wheel is viewed from the front side thereof, the two tines and the first and second spoke cores intersect each other obliquely in plane view; and wherein the air bag module is directly fixed to the two tines of the third spoke core in a non-pivotal manner, such that, if either of the tines is deformed, the airbag module is forced to follow such deformation, which changes the direction of air bag deployment.

2. A steering wheel according to claim 1, further comprising a reception seat provided in at least one of said spoke cores, wherein said air bag module abuts with said reception seat.

3. A steering wheel according to claim 1, further comprising a reception seat provided on each tine, wherein the air bag module abuts against the reception seats.

4. A steering wheel comprising:

a boss portion, which connects to a steering shaft;

a rim portion surrounding the boss portion;

a spoke portion that connects the boss portion to the rim portion, wherein the spoke portion includes:

a first spoke core;

a second spoke core, wherein the first and second spoke cores are substantially aligned, when viewed in an axial direction of the steering shaft, and form a continuous member that is joined to the boss portion, and a middle line, which perpendicularly intersects the axis of the steering wheel, divides the steering wheel into an upper portion and a lower portion, wherein the upper portion is above the lower portion when the steering wheel is in a neutral position, and the first and second spoke cores are located substantially in the upper portion of the steering wheel, and a third spoke core, which is substantially in the lower portion of the steering wheel, wherein:

the third spoke core is transverse to the first and second spoke cores and connects the first and second spoke cores to the rim portion; and the third spoke core is bifurcated to form two tines such that the tines are connected respectively to the first and second spoke cores, such that when the steering wheel is viewed along the axis of the steering shaft, the two tines respectively intersect the first and second spoke cores obliquely; and an air bag module fixed directly only to the third spoke core, wherein a fixing portion of the air bag module, which fixes the airbag module to the steering wheel, is spaced apart from a longitudinal centerline of the first and second spoke cores, wherein the air bag module is fixed directly to the two tines in a non-pivotal manner such that, if either of the tines is deformed in a forward direction of the steering wheel, the orientation of the air bag module will change accordingly.

5. A steering wheel according to claim 4, further comprising a reception seat provided on the third spoke core, wherein the air bag module abuts against the reception seat.

6. A steering wheel according to claim 4, further comprising a reception seat provided on each tine, wherein the air bag module abuts against the reception seats.

* * * * *